United States Patent [19]

Kauppila

[11] Patent Number: 5,830,356
[45] Date of Patent: Nov. 3, 1998

[54] HYDRAULIC DIFFERENTIAL CLARIFIER

[75] Inventor: Jeffrey Charles Kauppila, Austin, Tex.

[73] Assignee: Enviroquip, Inc., Austin, Tex.

[21] Appl. No.: 747,428

[22] Filed: Nov. 20, 1996

[51] Int. Cl.$^6$ .................................................. B01D 21/24
[52] U.S. Cl. ......................... 210/525; 210/528; 210/533; 210/540
[58] Field of Search ................................. 210/525, 528, 210/533, 540

[56] References Cited

U.S. PATENT DOCUMENTS

| | | | |
|---|---|---|---|
| 2,922,524 | 1/1960 | Rankin | 210/528 |
| 3,349,030 | 10/1967 | Savage | 210/528 |
| 3,371,788 | 3/1968 | Smith | 210/525 |
| 3,494,462 | 2/1970 | Baud | 210/528 |
| 3,722,698 | 3/1973 | Hampton | 210/525 |
| 3,800,955 | 4/1974 | Edgerton et al. | 210/528 |
| 4,193,877 | 3/1980 | Lillywhite | 210/525 |
| 5,340,485 | 8/1994 | Bradley et al. | 210/525 |

OTHER PUBLICATIONS

"Discussion of the Enviroquip SS Series Concepts", 21300–D, Nov. 11, 1987, published by Enviroquip, Inc.
"Phase 01—SS–IV Clarifier", Job. No. 36013, Enviroquip, Inc., Town Creek WWTP.
"Phase 08—Clarifier", Job. No.35003, Enviroquip, Inc., Angleton WWTP.

*Environews*, Winter 1991, vol. 5, No. 1, published by Enviroquip, Inc.

"IV. SS Rapid Swdge Removal Clarifier".

*Primary Examiner*—Christopher Upton
*Attorney, Agent, or Firm*—Thomas M. Freiburger

[57] ABSTRACT

A clarifier basin in a wastewater treatment system includes a sludge collection manifold structure which allows individual visual inspection and monitoring of sludge flows from individual sludge removal tubes, representing different sludge collection zones in the basin. The width from front to back of each clarifier arm is maintained to a minimum by providing a baffle adjacent to the outflow of each sludge removal tube. This defines a separate sludge flow for each sludge removal tube, although the flows are integrated beyond the baffles in the common channel. The benefits of high velocity sludge flow, minimal arm width and individual monitoring and sampling outflow from each removal tube are maintained, while providing an arrangement which is structurally sound, minimal in weight and less costly than many previous clarifier systems.

12 Claims, 3 Drawing Sheets

HYDRAULIC DIFFERENTIAL CLARIFIER

BACKGROUND OF THE INVENTION

The invention relates to systems for treating wastewater. More specifically the invention is concerned with removing sludge and scum from wastewater in a clarifier basin using a hydraulic differential clarifier.

Hydraulic differential clarifiers are well known. For example, Enviroquip's Original Series VI Hydraulic Differential Clarifier is a clarifier which removes sludge from the bottom of a clarifier basin while simultaneously skimming and removing scum from the top of the wastewater in the basin. The Series VI Clarifier uses two colinear rake arms connected to a central motor which slowly rotates the rake arms around the clarifier basin. Connected to the rake arms are a plurality of substantially vertical sludge withdrawal tubes extending from the bottom of the basin up near to the surface of the wastewater, where they support sludge troughs. Each sludge withdrawal tube has openings at top and bottom. Sludge enters the bottom and is then conveyed up the pipe into an individual sludge trough via an artificially created hydraulic differential, i.e., the trough bottom is below the surface of the liquid outside the trough. After the sludge arrives in the troughs, it flows through the troughs toward a sludge outlet pipe located in the center of the basin which channels the sludge out of the basin for treatment.

In the original Series VI Hydraulic Differential Clarifier, each sludge removal tube pumps sludge from the bottom of the tank into a separate sludge trough, so a user may visually monitor and sample the sludge from different clarifier zones. Because many sludge removal tubes are required to efficiently remove all of the sludge from the bottom of the basin, several separate and parallel troughs were provided. The many parallel open troughs used in the Series VI design are heavy and create a complicated connection where the troughs meet a central site well and sludge outlet pipe. Further, the large number of troughs in the Series VI cause leveling problems due to buoying of the troughs, particularly when different trough lengths are used on each arm. Also, the multiple troughs occupy a large surface area thus reducing the clarifier surface loading area and decreasing clarifier efficiency. For the foregoing reasons, there is need for a hydraulic differential clarifier having a simple and more compact open trough sludge system which can be inexpensively manufactured and which will have a simple site well connection thereby strengthening the clarifier structurally.

SUMMARY OF THE INVENTION

The present invention is directed to a clarifier apparatus which allows visual monitoring and sampling of sludge from different clarifier zones but eliminates the multiplicity of collection manifolds or sludge troughs used in the prior art. The invention is a hydraulic differential clarifier apparatus comprising one or two sludge rake arms, a plurality of substantially straight sludge removal tubes and an open collection manifold having separation baffles.

As in prior systems, when two rake arms are used, the two arms extend almost entirely across the radius of the clarifier basin, adjacent to the bottom of the basin, and are colinear. Located at the surface of the wastewater contained by the clarifier basin is a collection manifold supported by sludge removal tubes which in turn are supported by the rake arms. The sludge removal tubes extend from the bottom of the basin up to the bottom of the collection manifolds and preferably are straight or nearly straight in order to allow easy cleaning of the tubes with a straight rod or hose from above. A bridge spanning the radius of the basin allows access to the tubes from above for cleaning.

As in prior systems, the rake arms are rotated around the basin by a motor located at the center of the basin. Rotation of the arms causes sludge settled on the bottom of the clarifier basin to enter the sludge removal tubes and to rise up the tubes into the collection manifold via artificially created hydraulic differential pressure. Once sludge reaches the open trough collection manifold it is initially maintained separate from a main or common sludge flow in the collection manifold by a separation baffle of the invention. Thus, individual sludge flows from the tubes can be visually observed and samples can be taken of the sludge emanating from each sludge removal tube, before the flow combines with the sludge from the other sludge tubes in the common trough.

As in prior systems, the clarifier apparatus may also include a plurality of V-shaped plow flights attached to the rake arm near the bottom of the clarifier basin, positioned such that the plow flights gently direct sludge sitting on the bottom of the basin toward the removal tubes for movement up the tubes into the collection manifolds. These flights are preferably at least six inches deep, having squeegees attached to the bottom of the flights for lightly scraping the bottom of the clarifier basin.

The clarifier apparatus may also include a scum removal system comprising a scum trough adjacent the leading edge of the collection manifold, at least three scum ports, a scum baffle and a spray system. Scum entering the scum ports from the liquid surface can either be mixed with the sludge or removed separately from the basin by a separate removal conduit.

Just inside the basin's perimeter, extending slightly above and below the surface of the wastewater, is a scum baffle which preferably continuously contacts the outboard end of the rotating collection manifold. The outboard end of the collection manifold structure preferably is angled so as to trap scum between the scum baffle and the outboard end of the manifold, forcing scum into the first scum port with rotation of the rake arms. A wiper assembly may be included on the outboard end of the collection manifold to help push the trapped scum through the first scum port.

Spray nozzles may be attached to a spray header attached to the bridge. Sprayed water traps scum in place to force it through the scum ports into the scum trough.

In a preferred embodiment, each sludge removal tube has a flow control means, which may comprise telescoping valves, adjustable from the bridge, to control the rate which the sludge flows through each sludge removal tube. Thus, after visually monitoring and/or sampling the sludge emanating from each sludge removal tube, the user may individually adjust the flow rate of each tube to optimize the downstream treatment.

As explained above, the sludge collection manifold of the invention provides individualized flows of sludge out of each sludge tube and into a baffled area for individual inspection, while still including a common trough for directing the combined flows to the withdrawal area. This increases sludge flow velocity (as compared to prior multiple trough systems), which decreases settling of solids in the trough. This in turn decreases daily operation maintenance.

As in prior systems, tie rods may be used to help keep the sludge removal pipes vertical. When assembled together, the flight arm frame, vertical piping, collection manifold and connecting tie rods all form a trussed system capable of withstanding heavy loads.

It is therefore among the objects of the invention to improve clarifiers by providing only one open collection manifold or trough per rake arm, with separation baffles therein to allow monitoring of the sludge from separate clarifier zones. The use of one collection manifold reduces the cost of the clarifier, and allows for a simpler design particularly where the collection manifold meets the sludge collection site well and/or sludge outlet pipe, thereby structurally strengthening the clarifier. Moreover, the single collection manifold or flow trough increases the clarifier surface loading area thereby increasing the clarifier efficiency, while also reducing weight and bearing life. Furthermore, the new apparatus is more cost effective than the prior art because only one collection manifold need be constructed. Also, having only one collection manifold per rake arm reduces the weight of the entire apparatus thus, increasing the bearing life. Finally, utilizing only one open collection manifold per arm eliminates problems encountered in leveling the clarifier which were caused due to buoyancy of troughs when different collection manifold lengths were used on each arm. These and other objects, advantages and features of the invention will be apparent from the following description of preferred embodiments, considered along with the accompanying drawings.

DESCRIPTION OF PREFERRED EMBODIMENTS

Figure 1:
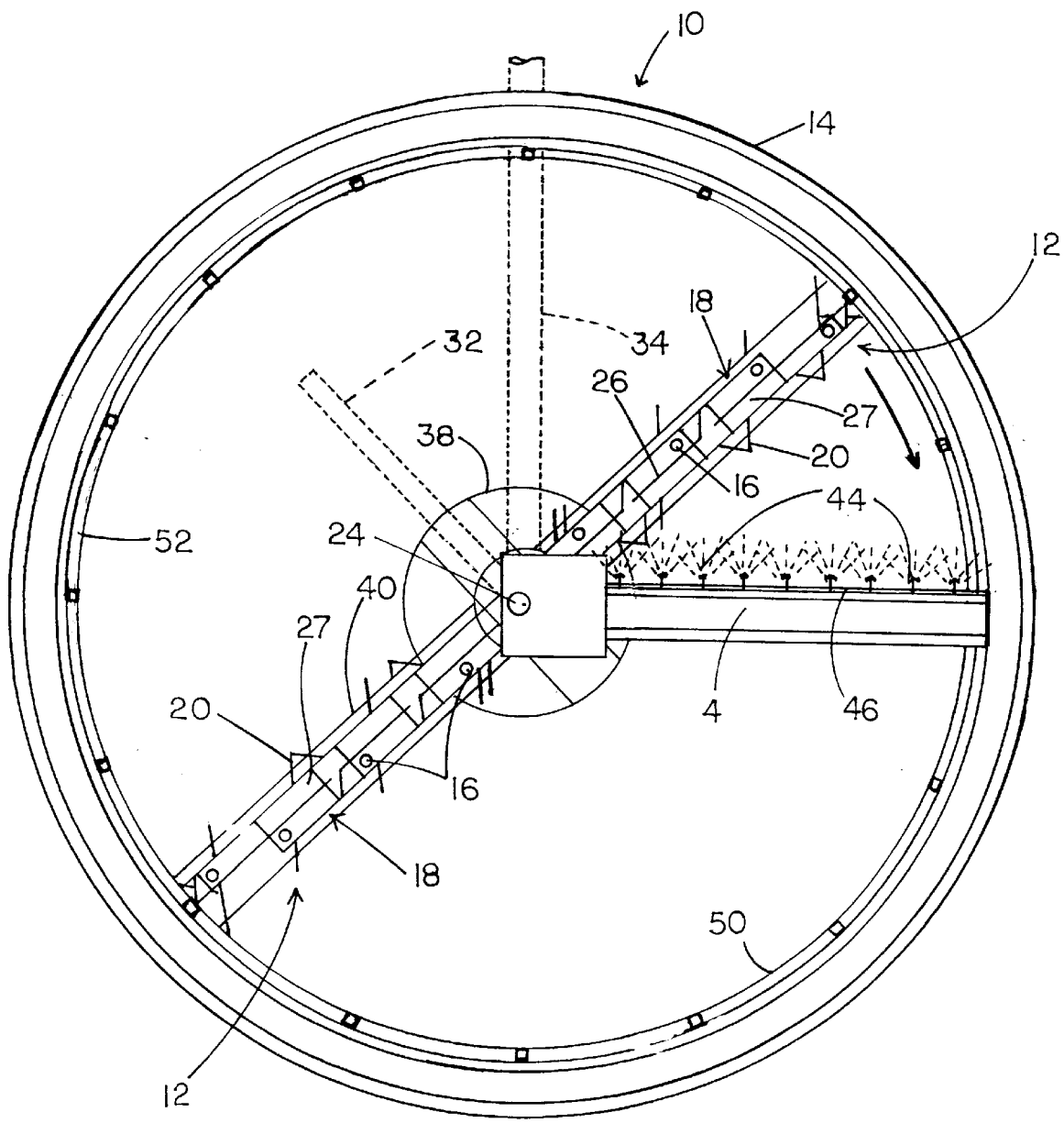
FIG. 1 is a schematic plan view of showing a clarifier and a clarifier basin, in which the system of the invention is incorporated.

In the drawings, FIG. 1 shows in plan view a clarifier apparatus 10, which may be used in a sewage treatment plant. The apparatus 10 includes two rake arms 12, extending almost entirely across a clarifier basin 14. As can be more clearly seen in FIG. 2, the rake arms 12 support sludge removal tubes 16 extending from the rake arm 12 up to an open-topped collection manifold 18. Sludge on the bottom of the clarifier basin 14 is channeled toward the sludge removal tubes 16 by V-shaped plow flights 20 preferably having brass squeegees 22 connected to the bottom of the flights 20. A drive assembly 24 rotates the rake arms 12 to collect the sludge from the bottom and to assist in moving the sludge from the bottom of the clarifier basin 14 up into the open collection manifold 18.

Figure 2:
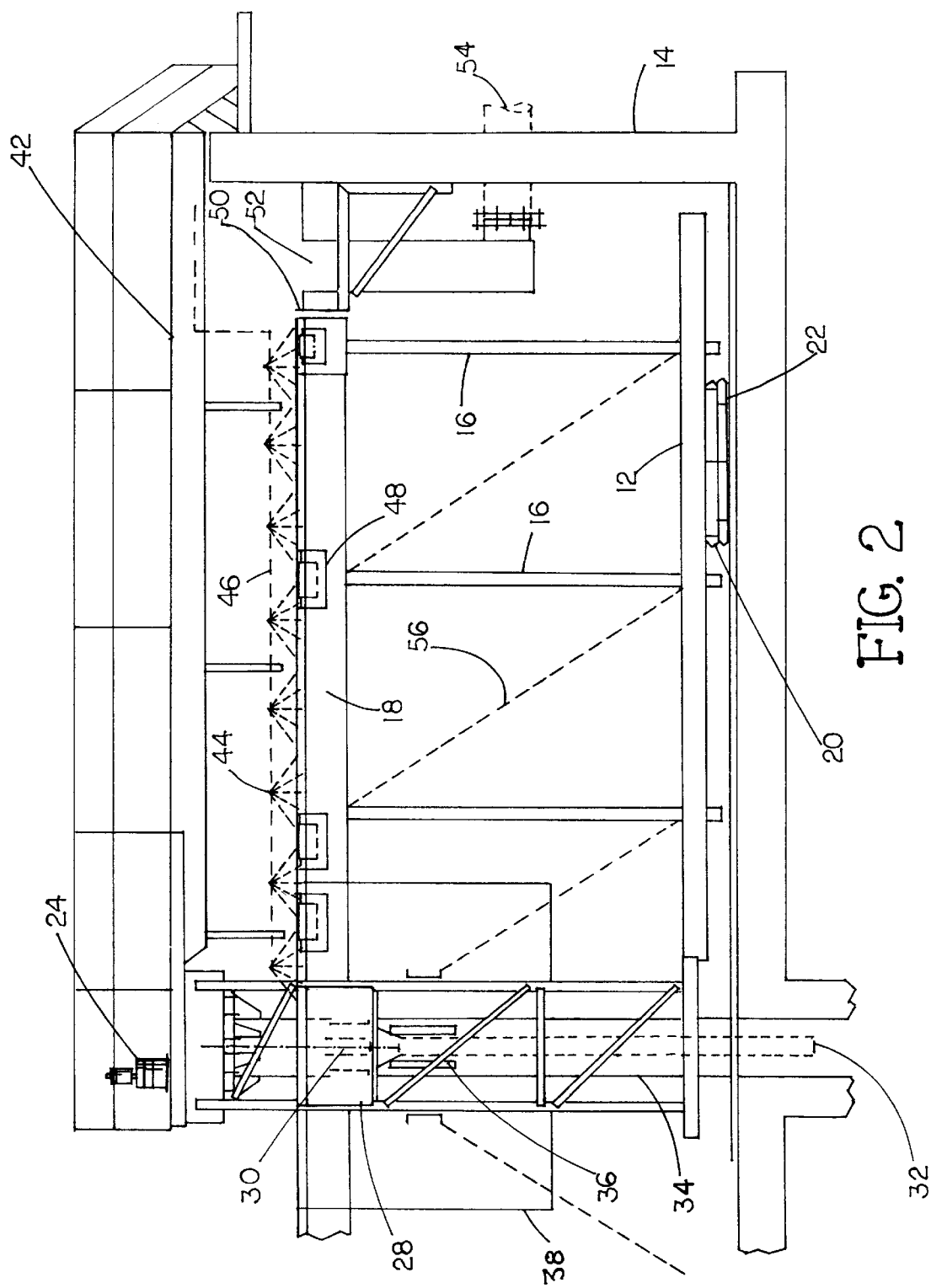
FIG. 2 is a schematic elevation of the clarifier apparatus within the clarifier basin.
Figure 3:
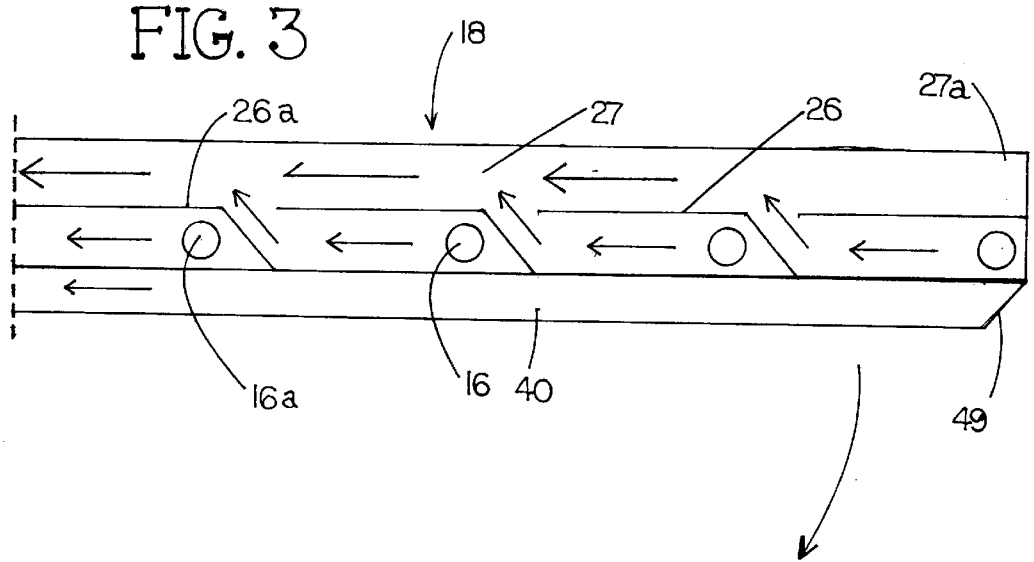
FIG. 3 is a plan view showing a preferred embodiment of the open collection manifold of the invention.

As seen in FIG. 3, separation baffles 26 in the open collection manifold 18 maintain separation of the sludge coming from each withdrawal tube 16 from a main sludge flow in a main or common flow trough 27 of the collection manifold 18. Separation is maintained for a distance sufficient for visual inspection and/or sampling of flow from individual tubes 16. Once the sludge arrives in the common flow trough 27, the sludge flows toward a sludge collection box 28 seen in FIG. 2. Thereafter, the sludge enters sludge ports 30 from which it finally flows through a sludge return pipe 32 out of the basin for treatment.

Influent to the clarifier flows in through a center inflow pipe 34 and into the basin 12 through influent feed ports 36. The influent then is contained by an influent feedwell 38 which is about half the depth of the wastewater. The feedwell 38 acts as a stilling well and causes particles to clump together and settle on the floor of the basin 12.

Rotation of the rake arms 12 and the open collection manifold 18 also skims scum from the surface of the wastewater. In a preferred embodiment a scum removal trough 40 (FIG. 3) is secured adjacent to the leading edge of the collection manifold 18. A spray system is attached to a bridge 42 above. As is typical, the bridge spans from the exterior of the basin 14 to the center of the basin in order to allow visual inspection and maintenance of the center pier drive and visual monitoring of the collection manifold 18 as well as cleaning of the sludge withdrawal tubes 16. The spray system comprises spray nozzles 44 attached to a spray header 46 (indicated schematically by dashed lines). Water is sprayed from the nozzles 44 onto the wastewater surface thus trapping scum located on the surface of the wastewater. When the rake arm 12 and collection manifold rotate, the scum is forced through scum ports 48 (see FIG. 2) into the scum removal trough 40. In a preferred embodiment the scum is removed with the sludge via the sludge return pipe 32. In an alternate embodiment a separate conduit (not shown) may be used to pipe the scum separately out of the clarifier basin 14.

The scum ports 48 are located on the leading edge of the scum trough 40 just ahead of the collection manifold 18. Two scum ports should be located near the influent feedwell 38. Another scum port 48 should be located at the outboard end of the collection manifold 18, i.e. the end farthest from the center of the clarifier basin 14. In a preferred embodiment the collection manifold structure has an outboard end 49 which, as shown in FIG. 3, is angled outwardly and back (opposite the movement direction), and contacts a scum baffle 50 extending just above and below the surface of the wastewater inside the perimeter of the clarifier basin 14. A wiper assembly (not shown) forces trapped scum into the outboard scum port 48.

As shown in FIGS. 1 and 2, an effluent trough 52 preferably runs around the inside perimeter of the basin 14 between the scum baffle 50 and the basin wall. Clean liquid is directed through weirs (not shown) into the effluent trough 52 and eventually out of the basin through an effluent conduit 54, carrying material collected in the trough 52.

A cable and turnbuckle assembly 56 is attached between the manifold trough and the rake arm frame and is used to strengthen the whole assembly by creating a cantilevered, trussed system.

Telescoping valves (not shown) may be used to control the flow rate of the sludge from the bottom of the clarifier basin 14 into the collection manifold 18. Such a telescoping valve is shown in U.S. Pat. No. 5,545,358, and the disclosure of that patent is incorporated herein by reference. A user can adjust the telescoping valves from the bridge 42.

As noted above, FIG. 3 shows one preferred embodiment of the open collection manifold 18. The scum removal tubes 16 deliver the sludge into the manifold 18, but when the sludge first exits the withdrawal tubes 16 it is separated from sludge from other sludge withdrawal tubes 16, by the separation baffles 26. Except for an inboard sludge tube 16$a$ and baffle 26$a$, the sludge from all tubes flows into the common main sludge trough 27 in the FIG. 3 configuration. In this configuration it can be seen that an outboard portion 27$a$ of the main trough 27 can be eliminated, as also shown schematically in FIG. 1.

Figure 4:
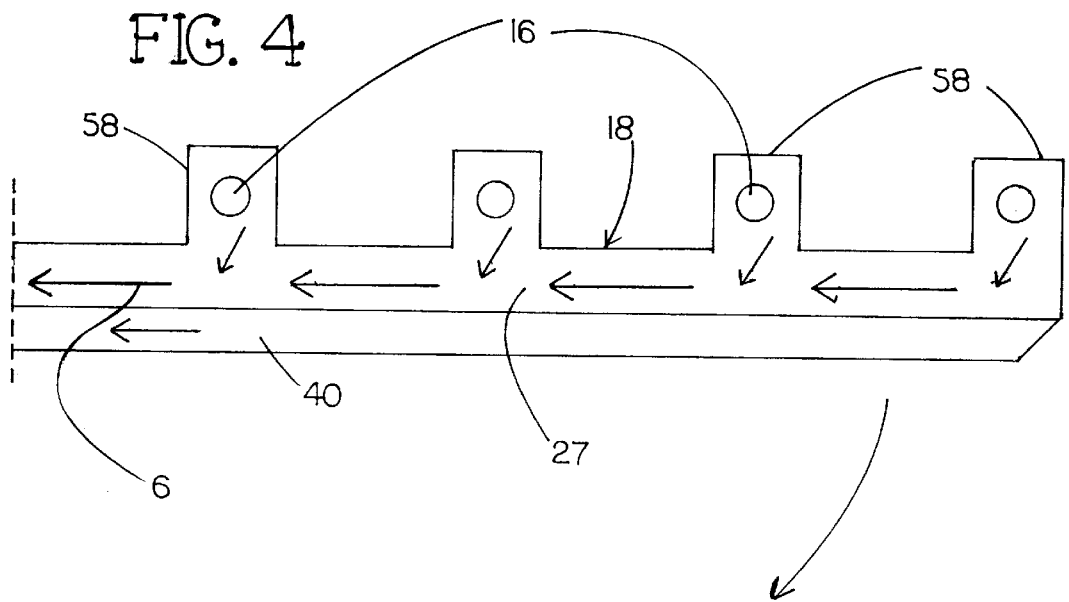
FIG. 4 is another plan view showing an alternative embodiment of the open collection manifold.

FIG. 4 illustrates an alternative embodiment of an open collection manifold 18$a$. The sludge withdrawal tubes 16 each draw sludge into a monitoring box 58 before the sludge enters the main sludge flow in a common trough 27. The sludge from different clarifier zones can thus be monitored visually in the boxes 58 before it mixes with the main sludge flow. As in FIG. 3, a scum trough 40 is affixed just forward of the collection manifold 16. The FIG. 4 configuration allows further reduction of surface area of the manifold structure 18a, thus adding further to efficiency of the clarifier system. At the flow arrow 60 sludge from four sludge tubes 16 is integrated to a single flow in the trough 27.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a clarifier apparatus of the type in which a sludge rake arm, supporting a plurality of upwardly extending sludge removal tubes which are connected at upper ends to an open sludge collection manifold located at the surface of a liquid in a clarifier basin, is rotated by a drive assembly so that the sludge removal tubes, extending from the bottom of the clarifier basin to upper ends at the bottom of the collection manifold, convey sludge gathered from the bottom of the basin up into the open sludge collection manifold via hydraulic differential, the improvement comprising:

the open sludge collection manifold being comprised of a common for sludge flow trough for receiving sludge flow from all of the sludge removal tubes, and baffle means between at least some of the sludge removal tube upper ends and the common sludge flow trough, forming a side sludge channel parallel to said common sludge trough, within which the sludge removal tube upper end lies, for initially isolating the sludge flow as it emanates from the sludge removal tube before the sludge flow is integrated into the common sludge flow trough, thereby allowing visual monitoring and physical sampling of the sludge individually emanating from each removal tube.

2. The clarifier apparatus of claim 1 in which the sludge rake arm also supports a plurality of V-shaped plow flights positioned adjacent the basin floor such that the plow flights gently direct sludge settled on the basin floor toward the removal tubes.

3. The clarifier apparatus of claim 2 in which the plow flights further comprise squeegees attached to the bottom of the flights positioned to lightly scrape the bottom of the clarifier basin, the squeegees being stiff enough to move the sludge but flexible enough to bend over objects located on the basin floor.

4. The clarifier apparatus of claim 1, further comprising a deep influent well which acts as a stilling well whereby liquid flowing into the basin slows in velocity causing particles in the liquid to clump together and settle to the basin floor.

5. The clarifier apparatus of claim 1 further including a scum removal system.

6. The clarifier apparatus of claim 5 in which the collection manifold further comprises a scum removal trough adjacent to the leading edge of the open collection manifold.

7. The clarifier apparatus of claim 6, in which the scum removal system further includes a scum baffle positioned just inside the perimeter of the basin, extending slightly above and below the surface of the liquid.

8. The clarifier apparatus of claim 7, in which an outboard end of the collection manifold is angled outward and rearward relative to the direction of movement of the clarifier apparatus, and further including a wiper engaging the scum baffle to trap scum for removal via the removal trough.

9. The clarifier apparatus of claim 1, wherein the sludge removal tubes extend generally vertically.

10. The clarifier apparatus of claim 9, wherein the sludge removal tubes are generally straight, providing for cleanout from above.

11. The clarifier apparatus of claim 1, in which the sludge removal tubes include flow control means at their upper ends.

12. The clarifier apparatus of claim 11, in which the flow control means comprises telescoping valves with means for adjusting the flow rate of the sludge out of the sludge removal tubes.

* * * * *